(12) United States Patent
Madison, Jr. et al.

(10) Patent No.: US 7,756,964 B2
(45) Date of Patent: Jul. 13, 2010

(54) MODULAR INTEGRATED COMPUTING AND STORAGE

(75) Inventors: Carl T. Madison, Jr., Winsdor, CO (US); David L. Trachy, Longmont, CO (US); John R. Kostraba, Jr., Thornton, CO (US)

(73) Assignee: Oracle America, Inc., Redwood City, CA (US)

( * ) Notice: Subject to any disclaimer, the term of this patent is extended or adjusted under 35 U.S.C. 154(b) by 154 days.

(21) Appl. No.: 12/147,190

(22) Filed: Jun. 26, 2008

(65) Prior Publication Data

US 2009/0327477 A1    Dec. 31, 2009

(51) Int. Cl.
G06F 15/16    (2006.01)
G06F 12/00    (2006.01)

(52) U.S. Cl. ..................................... 709/223
(58) Field of Classification Search ......... 709/217–218, 709/220–221, 223–229
See application file for complete search history.

(56) References Cited

U.S. PATENT DOCUMENTS

| | | | |
|---|---|---|---|
| 6,145,001 A * | 11/2000 | Scholl et al. ................ | 709/223 |
| 7,275,098 B1 * | 9/2007 | Becher et al. ............... | 709/223 |
| 7,536,558 B2 * | 5/2009 | Neble et al. ................. | 713/189 |
| 2004/0133793 A1 * | 7/2004 | Ginter et al. ................ | 713/193 |
| 2004/0254826 A1 * | 12/2004 | Yang et al. ..................... | 705/8 |
| 2005/0066045 A1 * | 3/2005 | Johnson et al. ............. | 709/230 |
| 2005/0262103 A1 * | 11/2005 | Stakutis et al. ................ | 707/10 |
| 2006/0167883 A1 * | 7/2006 | Boukobza .................... | 707/10 |
| 2006/0233180 A1 * | 10/2006 | Serghi et al. ................ | 370/401 |
| 2007/0204337 A1 * | 8/2007 | Schnackenberg et al. ...... | 726/11 |
| 2007/0283002 A1 * | 12/2007 | Bornhoevd et al. ......... | 709/224 |
| 2009/0323552 A1 * | 12/2009 | Beers et al. ................. | 370/254 |
| 2009/0327477 A1 * | 12/2009 | Madison, Jr. et al. ........ | 709/224 |

* cited by examiner

*Primary Examiner*—Zarni Maung
(74) *Attorney, Agent, or Firm*—Marsh Fischmann & Breyfogle LLP; Kent A. Lembke; Michael C. Martensen

(57) ABSTRACT

A modularized computing system includes a plurality of modular components that are coupled together forming a network. Each modular component includes a standard network interface. The system further includes an initialization module, a monitor module, a storage medium, and a management module. As a module unit is coupled to the network, the initialization module automatically configures the component to an operable state. The monitor module monitors network operations including performance parameters of each modular component based on a plurality of system policies. Based on information gathered by the monitor module, the management module actively modifies network structure and resource allocation to optimize network performance.

18 Claims, 2 Drawing Sheets

MODULAR INTEGRATED COMPUTING AND STORAGE

BACKGROUND OF THE INVENTION

1. Field of the Invention

Embodiments of the present invention relate, in general, to integrated computing and storage systems and particularly to a system for automated integration of modular computer and storage components.

2. Relevant Background

A computer system can be characterized as a diverse combination of electronic components that function together as a cohesive entity. In its simplest terms, a computer consists of a processor, some form of a storage medium, and a means to communicate between the processor and storage medium. A personal computer, for example, typically includes one microprocessor, a combination of read only memory and random access memory, and a communication bus to transfer data and code between the processor and the various forms of memory.

When a user elects to expand the capability of a personal computer, for example to expand the storage capability, one option is to purchase a larger hard drive that is either internally or externally based. Depending on the type and brand, this added storage capability can be added in what is known to one skilled in the art as "plug and play". And while it is possible to couple two or more personal computers together to increase computational capability, such a task is not trivial. For example, consider the difficulty in linking a computer based on an Apple® operating system to one operating on a Microsoft® operating system so as to utilize both processors to address a problem present on a UNIX® based machine.

In network computing, the independent nature of compute and storage components becomes even more pronounced. A typical computing system includes several components. Typically a component is primarily a storage component or a compute component. These components are linked together by a network infrastructure such as routers, switches, gateways, and the like. When such a compute or storage component is added to an established network system, it is essentially an island unto itself. Beyond plugging the component into the same wall outlet for electrical power, a component newly added, to an established enterprise system has little ability to interact with any other system component. Without customizing network adapters, installing an operating system, modifying existing protocols to meet the network protocol, configuring network interfaces, and countless other configuration tasks, the component fails to be interoperable with the other components of the enterprise system.

Historically, operational costs of an enterprise system are many times greater than the initial capital outlay. In part this is due to the need to integrate each component as it is added to a system. However, operational costs do not cease once a component has been incorporated into a system. The cost of maintaining a system of compute and storage components is significant. To minimize these costs, entities strive to maintain a system that does not impede operations from lack of resources yet does not possess significant excess capabilities. Unfortunately systems today are designed for surge requirements. For example, during the holiday shopping period, an e-commerce provider may need 100 servers to ensure that customers are promptly and accurately provided with the ability to conduct a transaction. Even a momentary lapse in the system's capability can result in significant monetary losses. Thus systems are designed to address this momentary need yielding, during other periods, a highly inefficient storage and compute infrastructure. And while theoretically it may be possible for a technician to disconnect surplus components and then reinitialize them when needed, the cost of doing so is prohibitive when compared to simply maintaining their operational status. Thus many enterprise systems can be characterized as having vast amounts of excess capability over the majority of a system's life span. A challenge remains, therefore, for a system in which compute and storage components are modular such that they can be added and/or removed in an automated manner. These and other challenges present in the prior art are addressed by the present invention.

SUMMARY OF THE INVENTION

A modularized computing system, according to one embodiment of the present invention, includes a plurality of modular components that are coupled together forming a network. Each modular component includes a network interface that is common throughout the network. The system further includes an initialization module, a monitor module, a storage medium, and a management module. As a module unit is coupled to the network, the initialization module automatically configures the component to an operable state. The monitor module monitors network operations including performance parameters of each modular component based on a plurality of system policies stored in the storage medium. Based on information gathered by the monitor module, the management module actively modifies network structure and resource allocation to optimize network performance.

According to one embodiment of the present invention, performance parameters conveyed to the management module by the monitor module are compared to established system policies. Responsive to a module failing to meet an established policy, the management module automatically modifies the network by altering resource allocations within the existing network or by modifying the network structure itself. To maintain operations of the computing system in compliance with the system policies, the management module can add or remove modular components from the network. In addition, the management module can logically make a module component unavailable to network applications.

At least one embodiment of the present invention also includes the superimposition of logical data interconnects over the physical interconnect structure of the network so as to enable the management module to logically manage the network. The management module, according to one embodiment, can modify operational tasks of the modular components of the system based on each component's ability to be in compliance with the system policies. This modification can be accomplished dynamically or periodically and is automatic needing no user initiation or authorization.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figure 1:
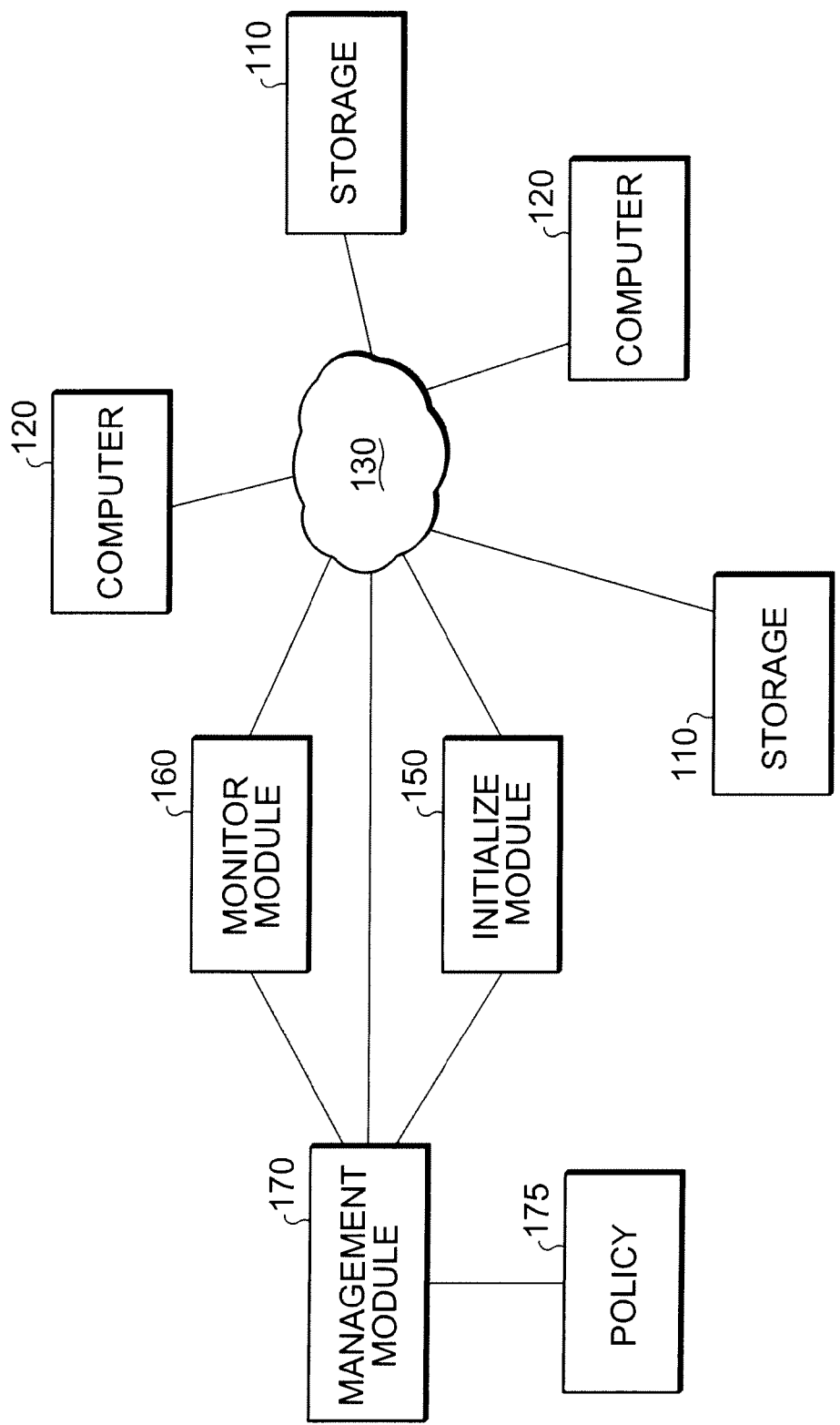
FIG. 1 shows a networked computer environment in which one embodiment of the present invention is implemented and FIG. 2 shows a flowchart of one method embodiment for managing a modular computing system according to the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

A modular computing system comprising a plurality of modular components coupled together via an interface common throughout the network is herein disclosed by way of example. According to one embodiment of the present invention, a plurality of modular components is coupled together to form a computing system. Included in the system is a plurality of modules configured to monitor, initialize, and manage the system's modular components.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

FIG. 1 is a high level block diagram of a computing system 100 comprising a plurality of managed modular components 110, 120. In this embodiment of the present invention, a plurality of compute modules 120 and storage modules 110 are coupled together via a network infrastructure 130 to form a computing system 100. A compute module 120, as will be understood by one skilled in the relevant art, is a computer, server or the like whose primary functionality is processing of data. Similarly, a storage module 110 is a modular component whose primary function is one of storage of data. To some degree a compute module 120 will possess some ability to store data and a storage module 110 will have some ability to process data; however, the functionality and design of each is such that its primary role, be it storage or computing, is driven by its inherent capabilities. For example, a compute module 120 may possess a number of processors including field programmable gate arrays. Conversely, a storage module 110 may include one of many forms of storage media including hard disk, tape, flash, etc. While each module possesses an interface to the system 100, the actual capabilities of each module can vary. Indeed one advantage of the present invention is to optimize performance of the system by capitalizing on the differing capabilities of each of the plurality of modular components 110, 120.

Turning again to FIG. 1, the system 100 also includes an initialization module 150, a monitor module 160, and a management module 170. Each of these modules is coupled so that they may interact with one another as well as with the remaining modular components 110, 120 of the system 100. In addition to these modules, a storage medium 175 is coupled to the management module 170, according to one embodiment of the present invention, to provide to the management module 170 a plurality of system policies.

The policies maintained within the storage medium 175 and utilized by the management module 170 identify guidelines from which the management module 170 can implement modifications to the system 100. In addition, policies can include performance utilization parameters and/or indices that the management module can use to determine whether one or more components should be added or removed from the system or whether application tasks should be reallocated.

The storage medium 175 can, according to another embodiment of the present invention, include initialization protocols that can be transferred to the initialization module 150. When a new module is added to the system 100 or when an existing module has been removed and then at a later time is returned to an operational state, the initialization module 150, using protocols gained from the storage medium 175, automatically initializes the component and brings its capabilities online to the system 100. Similarly, when the management module 170 determines that a component's resources are no longer benefiting the system 100 and determines the system 100 would be better off without the component's contribution, the initialization module 150 can initialize procedures to remove the component from the system and place it into a dormant state.

According to one embodiment of the present invention, policies, protocols, procedures, indices and the like are predetermined and presented to the management module 150 for automatic implementation. In another embodiment of the present invention, policies stored in the storage medium 175 can be modified to reflect a changing environment.

As previously discussed and shown in FIG. 1, the monitor module 160 is coupled to the management module 170 and the system 100. The monitor module gathers information from each of the plurality of modular components 110, 120 throughout the system 100. Information including utilization of component resources, application tasks assigned to each of the components, and other performance indices is gathered by the monitor module 160 and conveyed to the management module 170. In one embodiment of the present invention, information gathered by the monitor module 160 is analyzed to determine whether the information complies with existing policies. When a component fails to meet an established policy or performance parameter, the identity of the component and the details of the policy breach are conveyed to the management module 170 for action. In other embodiments, the monitor module 160 conveys information to the management module 170 on a real time basis.

Based on information gathered by the monitor module 160, the management module 170 can automatically modify the system 100. Modification by the management module 170 can be done dynamically or periodically, and the scope of the modification can range from reallocation of component assigned tasks and resources to modification of the system structure itself. Due to the modular nature of each component 110, 120 that comprises the system 100, the management module has the ability to add and remove components at will. This capability is coupled with the ability to initialize a new module automatically.

For example, assume that the monitor module 160 reports to the management module 170 that several compute components 120 are being under utilized yet the many storage components 110 of a particular type are beyond an established storage capacity target. The management module 170, based on established policies and procedures, can ascertain via the monitor module 160 what application tasks are assigned to each component. Using information regarding each of the components' capabilities and utilization, the management module can reallocate application tasks to make some components more fully utilized in compliance with system policies thus rendering other components, in this case compute components, essentially idle.

Those compute components 120 that are idle can be removed from the system. At the same time the management module can add new storage components to address the need for additional storage space, or conversely, implement transfer of data to other types of storage mediums already established within the system that are not fully utilized. To the extent new resources need to be added to the system 100, the management module 170, working in conjunction with the initialization module 150, automatically brings the resources of a new component online.

Figure 2:
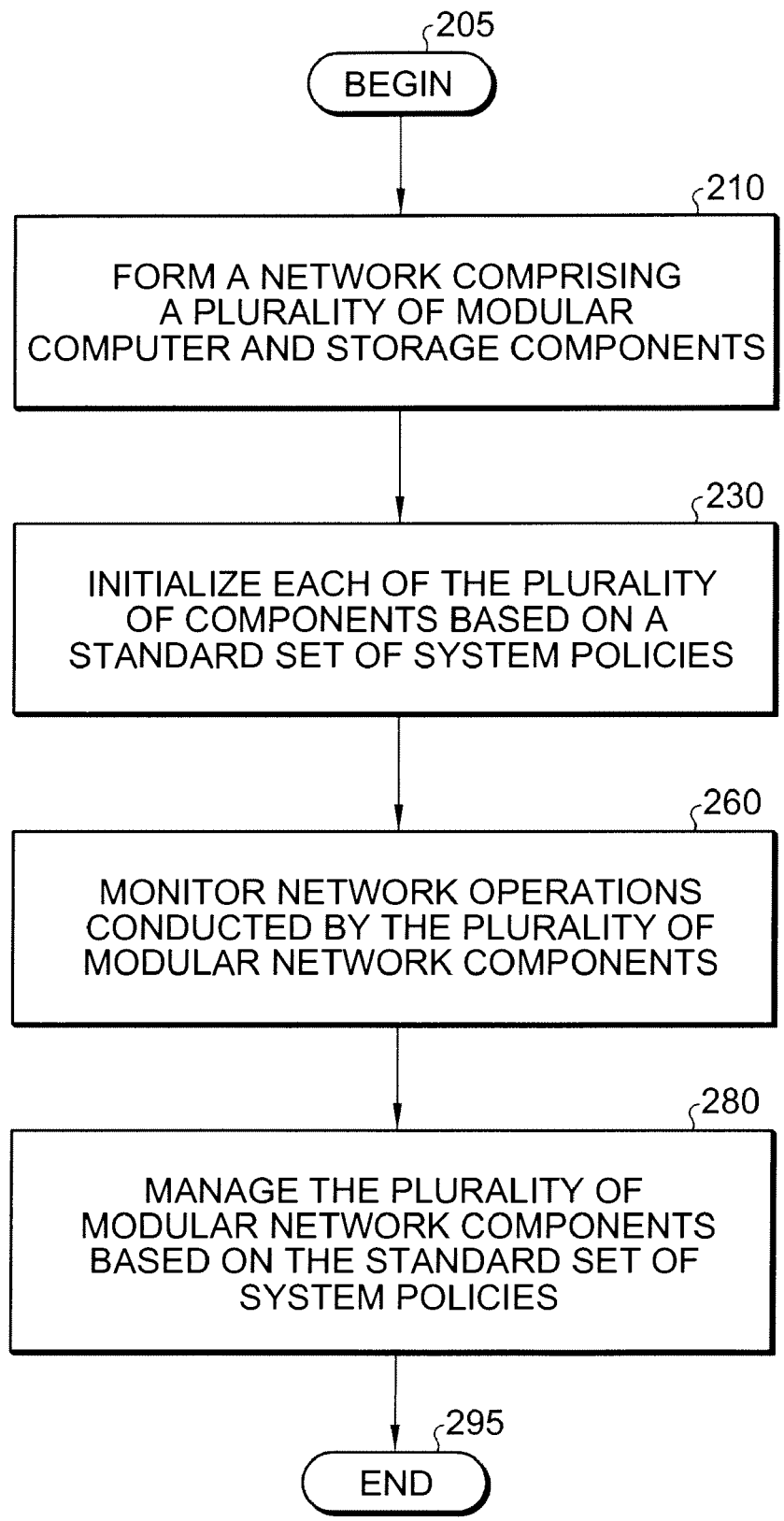

FIG. 2 is a flowchart illustrating a method of implementing an exemplary process for managing a modular computing system. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

One embodiment of a method for managing a computing system comprising modular components begins 205 with the formation 210 of the system using a plurality of commonly interfaced compute and storage components. Thereafter each of the plurality of components is automatically initialized 230 including installation of any needed communication and network protocols and/or other parameters necessary for each component to be a working member of the system.

From that point forward, each component in the system is monitored 260 by the monitor module. Each component is monitored for compliance with existing policies as well as indications that a component is either over utilized or under utilized. This, and other information, is used to manage 280 the plurality of network components and the applications which they are conducting. As a result 295 of this management, the system can operate more efficiently. As the removal and addition of modular components from and to the system is automatic, the present invention has the advantage of being able to automatically, and without the incurrence of additional cost, maintain individual component utilization and performance at peak levels. No longer do components operate at a fraction of their capacity or do excess components exist on a system simply because of surge periods. The modular nature of each component enables the system to minimize human interaction and thus optimizes system performance.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with a system for modular computing, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A modularized computing system comprising:
    a plurality of modular components coupled together forming a network wherein each component includes an interface common throughout the network;
    an initialization module coupled to the network and capable of communicating with each of the plurality of modular components;
    a monitor module coupled to the network and configured to monitor network operations conducted by the plurality of modular components;
    a storage medium configured to store a plurality of system policies; and a management module coupled to the monitor module, the initialization module, and the storage medium, wherein the management module modifies at least one of the modular components, via communications through the common interface, responsive to the monitored network operations indicating the at least one of the plurality of modular components is failing to comply with predefined performance utilization parameters defined in the plurality of system policies.

2. The system of claim 1 wherein the plurality of modular components includes compute components and storage components and the common interface is adapted to allow the management module to remove one or more of the compute components or storage components and place the removed one or more of the computer components or storage components in a dormant state.

3. The system of claim 1 wherein a new modular component added to the network is recognized by the monitor module and automatically initialized by the initialization module both via communications through one of the common interfaces included on the new modular component.

4. The system of claim 1 wherein the monitor module communicates component performance parameters of each of the plurality of modular components to the management module.

5. The system of claim 4 wherein responsive to the monitor module detecting at least one of the plurality of modular components failing to comply with the plurality of system policies, logically making said at least one modular component unavailable to network applications running on the plurality of modular components via operations of the management module.

6. The system of claim 1 wherein the modification includes dynamically adding modular components to the network or removing the at least one of the plurality of modular components.

7. The system of claim 1 wherein the network includes a plurality of physical interconnects and wherein a plurality of logical data interconnects coupling together each of the plurality of modular components can be superimposed on the plurality of physical interconnects.

8. The system of claim 7 wherein the plurality of logical data interconnects can be dynamically modified by the management module to optimize data processing and/or storage application performance including blocking access to one of the modular components based on the monitoring by the monitor module.

9. The system of claim 1 wherein the management module modifies operational tasks of the plurality of modular components in the network based on compliance by each of the plurality of modular components with the plurality of system policies as determined by the management module by comparison of the monitoring by the monitor module and the plurality of system policies defining operational ranges for the modular components.

10. The system of claim 9 wherein operational task modification of each of the plurality of modular components is automated by operation of the management module and communications with the modular components via the common interfaces.

11. The system of claim 9 wherein operational task modification of each of the plurality of modular components is conducted dynamically.

12. The system of claim 9 wherein operational task modification of each of the plurality of modular components is accomplished manually.

13. The system of claim 1 wherein an operator modifies operational tasks of the plurality of modular components in the network based on compliance by each of the plurality of modular components with the plurality of system policies.

14. A computer implemented method for managing a modular computing system, the method comprising:
    forming a network comprising a plurality of modular components wherein each component includes an interface that is common throughout the network;
    initializing each of the plurality of modular components based on a standard set of system policies stored in a storage medium coupled to the network;
    monitoring network operations conducted by the plurality of network components; and
    managing network operations including utilization of the plurality of network components, wherein the plurality of modular components includes compute and storage components, wherein the standard set of system policies includes predefined performance indices and initialization procedures, and wherein the managing comprises removing and adding ones of the modular components based on the monitoring and the predefined performance indices.

15. The computer implemented method of claim 14 wherein monitoring includes communicating component performance parameters of each of the plurality of modular components to a management module.

16. The computer implemented method of claim 15 further comprising modifying, by the management module, the network responsive to at least one of the plurality of modular components failing to comply with predefined performance utilization parameters established in the standard set of system policies.

17. The computer implemented method of claim 15 further comprising detecting at least one of the plurality of modular components failing to comply with the plurality of system policies and, responsive to said detection, logically removing said at least one modular component from network applications.

18. The computer implemented method of claim 15 further comprising modifying operational tasks of the plurality of modular components in the network based on compliance by each of the plurality of modular components with the standard set of system policies.

* * * * *